Nov. 21, 1944.    J. M. KELLY    2,363,337
MOLD AND PROCESS OF MAKING IT
Filed Nov. 12, 1941    2 Sheets-Sheet 1

WITNESSES:

INVENTOR
James M. Kelly.
BY
ATTORNEY

Nov. 21, 1944.  J. M. KELLY  2,363,337

MOLD AND PROCESS OF MAKING IT

Filed Nov. 12, 1941  2 Sheets-Sheet 2

WITNESSES:

INVENTOR
James M. Kelly.
BY
ATTORNEY

Patented Nov. 21, 1944

2,363,337

UNITED STATES PATENT OFFICE 2,363,337

MOLD AND PROCESS OF MAKING IT

James M. Kelly, Trafford, Pa., assignor to Westinghouse Electric & Manufacturing Company, East Pittsburgh, Pa., a corporation of Pennsylvania Application November 12, 1941, Serial No. 418,728

12 Claims. (Cl. 148—3)

This invention relates to molds and the process of manufacturing them.

Dies and molds have been produced heretofore by electroplating models or articles of manufacture which it is desired to reproduce, stripping the electroplate from the model and employing the stripped electroplated form as the die or mold. Considerable time was consumed in making such electroformed molds and dies, since the plating processes employed are slow, and it was thought necessary to build the electroformed plate to a thickness of ¼ inch or more in order to give strength to the plate and sufficient rigidity thereto to maintain the configuration and dimensions of the model.

Such electroformed plates, although sufficiently rigid to maintain the design details of the model while being handled, were not always strong enough by themselves to be employed in molding or casting processes. Various means have been employed heretofore for reinforcing the molds made of electroformed plate, but they have not proven to be commercially satisfactory.

Where the electroformed plate is backed by the usual methods of press fitting it into a machined steel or cast iron support or backing, expensive and difficult machining operations are necessary in preparing the reinforcing backing while extreme care must be exercised in press fitting the electroformed plate.

Attempts have been made to back the electroformed plate with cast metal, such as babbitt, aluminum or cast iron. In these instances it has been found to be quite difficult to obtain a permanent coextensive bond between the plate and the cast metal, and in many cases the electroformed die or mold is damaged during the casting process.

In other cases, the electroformed die or mold has been welded into a heavy metallic backing. Where welding is employed, considerable damage has often been encountered to the electroformed die or mold due to the high temperatures developed in making the weld. Also, in such cases, the backing must also be machined to receive the die or mold rendering the process of welding the mold to a heavy backing expensive, as well as commercially difficult to practice.

An object of this invention is to provide for reinforcing molds and the like.

Another object of this invention is to provide a process of reinforcing molds, dies and the like.

A more specific object of this invention is to provide a mold, die or the like integrally bonded to and supported by a strong supporting and reinforcing member.

Other objects of this invention will become apparent from the following description when taken in conjunction with the accompanying drawings, in which:

Figure 1 is a view in perspective of a model or pattern of a gear for the making of which it is desired to produce a die, mold or the like;

Figure 1:
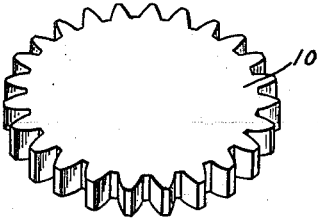
Figure 2:
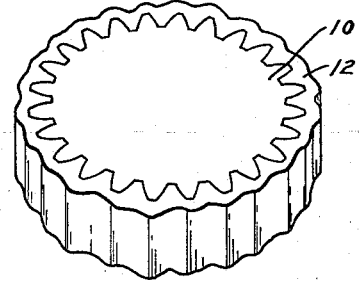
Fig. 2 is a view in perspective of the model of Fig. 1 with an electroformed plate formed thereon.

Referring to Figs. 1 and 2 of the drawings, this invention is illustrated by reference to an electroformed mold produced by well-known methods. Any of the electro-plating processes may be employed so long as dense electroplates which are free from cracking and porosity are obtained. It is, however, preferred to use the Ekko process of electroforming the mold, this process being well known for electroforming iron.

In preparing the electroformed mold, a model 10, such as the gear illustrated in Fig. 1, is prepared in any suitable manner, a preferred method being to make the model 10 from a bismuth-lead alloy which has a low melting point of about 255° F. This alloy is known to the trade as Cerro-base and can be readily machined. The particular gear model 10 illustrated can be formed by employing standard gear-cutting practices, a smooth finish being obtained over the entire surface of the model 10. However, as will be understood, other materials, such as plaster of Paris, low melting metals and alloys, graphite or suitable refractory oxides, may be employed in place of the preferred bismuth-lead alloy.

By employing the Ekko process of electroforming iron, an electroformed plate 12 is formed on the model 10, as illustrated in Fig. 2, the electroformed plate 12 having the exact dimensional configuration of the model 10. The iron deposited by practicing the Ekko process is to be preferred as the mold material for reasons which will be given hereinafter. The electroformed plate 12 can be readily formed on the model 10, as illustrated in Fig. 2, by masking one side of the model so that all exposed surfaces are electroplated with the dense iron plating.

The electroformed plate 12 is readily freed from the alloy model 10 by heating the electroplated model to a temperature above the melting point of the bismuth-lead alloy to melt the alloy. The liquid alloy is then poured or otherwise removed from the electroformed plate 12. Where other materials, such as plaster of Paris or graphite, are employed as the composition of the model, they can be readily removed from the electroformed plate 12 by any of the well-known means available to the industry.

With the electroformed plate 12 freed from the model 10, the facing edge of the mold formed by the electroformed plate 12 is plated by a material which is not readily wet by metal having the characteristics of copper, the reason for which will be described more fully hereinafter.

Figure 3:
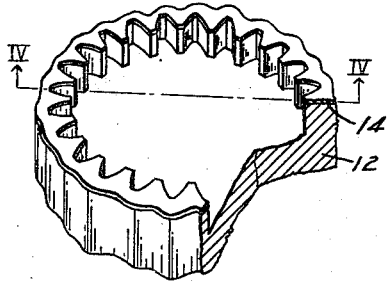
Fig. 3 is a view in perspective and partly in section illustrating the electroformed plate stripped from the model of the gear and treated in accordance with certain of the teachings of this invention.

In a preferred embodiment of this invention, a very thin plating 14, of the order of between .0005 and .001 of an inch, of chromium is applied to the facing edge of the electroformed mold 12, as illustrated in Fig. 3. In order to insure that the chromium plating 14 applied to the facing edge of the mold 12 will not be wet by metal having the characteristics of copper, the chromium plated mold is subjected to a heat treatment to oxidize the exposed surface of the chromium plate. In practice, the chromium plated mold is heated at a temperature between 845° C. and 865° C. and preferably at about 850° C. in a commercial hydrogen atmosphere, it being found that this atmosphere contains sufficient moisture for effecting the oxidation of the exposed chromium surface, while at the same time maintaining the exposed iron surfaces of the electroformed mold 12 bright. The heating at this temperature also functions to anneal the iron of the mold so that distortion under the steps of the process to be described hereinafter will be minimized.

Figure 4:
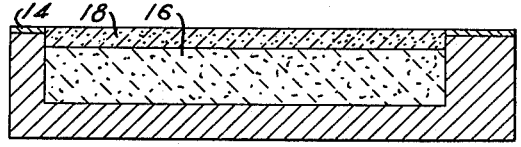
Fig. 4 is an enlarged view in section taken along the line IV—IV of Fig. 3 and embodying certain of the teachings of this invention.

The annealed mold 12 having the chromium plate 14 on its facing edge is then further prepared for applying the reinforcing backing for supporting the mold 12. In this particular step of the process, the mold cavity of the mold 12 is substantially filled with a refractory powder 16, such as fused magnesium oxide of approximately 30 to 60 mesh size, as illustrated in Fig. 4, and the substantially filled cavity is sealed from the atmosphere by a thin layer 18 of Alundum cement. The entire cavity is thus filled with refractory material protecting the entire working face or cavity of the mold. Where the electroformed mold 12 is of small size, this step of the process may be omitted, but where the mold is of a large size of the order of more than four inches in diameter, it is necessary to protect the mold cavity in this manner for reasons which will be apparent hereinafter.

Figure 5:
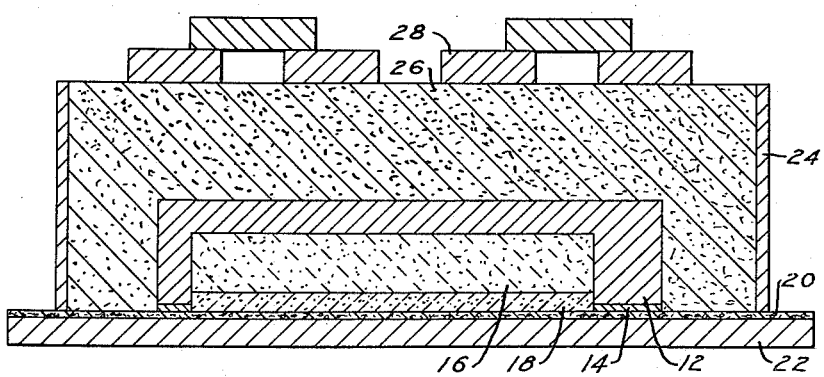
Fig. 5 is an enlarged view in section illustrating an embodiment of this invention.

With or without the mold cavity filled with refractory material 16 and sealed by the layer 18 of Alundum cement depending upon the size of the mold, the mold is inverted, as illustrated in Fig. 5, so that its facing edge carrying the chromium plate 14 seats upon a strip or sheet of asbestos 20 or other suitable material which is carried on a suitable steel plate 22. With the mold 12 in this position, a steel ring 24 is provided in spaced relation about the mold 12 to seat on the layer of asbestos 20, and the space between the mold 12 and the ring 24 is filled with metal 26 in a finely divided form. In the preferred embodiment of this invention, the metal 26 comprises iron particles having a predetermined fineness.

To this assembly, copper in the form of small pellets 28, or other readily melted form, is applied, as illustrated in Fig. 5, the amount of copper being preferably substantially equal by weight to the amount of iron 26 retained within the ring 24. The assembly with the copper in position on top of the iron powders is then subjected to sufficient heat of the order of 1100° C. to melt the copper and effect impregnation of the iron powders 26. The impregnation is preferably effected in a wet hydrogen atmosphere thereby preventing the formation of iron oxides when exposed to the high temperatures employed and maintaining the iron particles in a condition where they are readily wet by the copper.

In impregnating the iron powders 26 under the protective atmosphere, it is found that the copper bonds the iron powders one to the other, and at the same time wets the exposed surface of the mold 12 to bond the mass of impregnated iron to the back and sides of the electroformed mold 12 to form a solid integral metallic body composed of the electroformed mold surrounded by a body formed of iron and copper. Actually, the supporting body formed by the impregnated iron backing is composed of iron particles bonded together with a copper alloy containing from 0.10% to 4% of iron, the alloy being formed during the impregnating operation by a slight amount of the iron particles 26 being dissolved in the copper.

An examination of the integrally formed body reveals that the copper employed for filling the voids of the iron powders and for bonding the resulting mass to the electroformed mold 12 is prevented from flowing to the mold cavity of the electroformed mold 12 by the layer 14 of oxidized chromium on the facing edges of the mold 12. The sheet 20 of asbestos prevents the supported mold thus formed from sticking to the steel plate 22.

Figure 6:
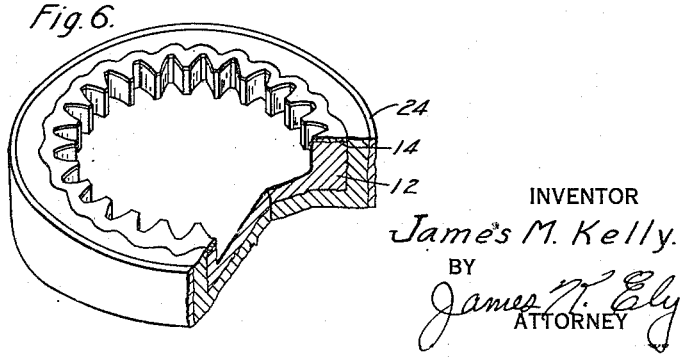
Fig. 6 is a view in perspective and partly in section of the reinforced mold produced in accordance with this invention.

In small molds, the layer 14 of oxidized chromium is sufficient for preventing the flow of the impregnating metal to the mold cavity. In the larger molds, however, it is found to be necessary to fill the mold cavity with the refractory material 16 and seal with the Alundum cement 18 in the manner described hereinbefore to prevent the impregnating metal from flowing to and filling the mold cavity due to the existing hydrostatic head of the impregnating metal or alloy above the inverted mold 12. The resulting reinforced mold is illustrated in Fig. 6 of the drawings, clearly showing the component parts forming the reinforced mold. Where desired, the chromium plate 14, illustrated in Fig. 6, can be removed by machining.

Although in the foregoing description the impregnating metal is referred to as being copper, it is, of course, understood that other metals and alloys which have the characteristics of copper, of having a low melting point and being capable of wetting iron while not wetting oxidized chromium, can be utilized as the impregnating metal. For example, the copper base alloys described in my Patents Nos. 2,147,844, dated February 21, 1939, and 2,169,190, dated August 8, 1939, or other suitable copper base alloys, are satisfactory for use as the impregnating metal.

In order to strengthen the supporting member formed by the impregnated finely divided metal backing, the metal particles 26 may be subjected to a sintering treatment prior to impregnating the particles. Thus the assembly with the iron particles retained in position by means of the ring 24, as illustrated in Fig. 5, and free of the copper pellets 28, is subjected to a treatment consisting of heating it for about one hour at a temperature of 1050 to 1150° C. in a commercial hydrogen atmosphere. The sintering of the iron particles 26 in this manner prior to impregnating with the metal having the characteristics of copper increases the hardness and tensile strength of the resulting mass, while at the same time so reduces any oxides which may be present on the iron particles that a sound impregnated body will be obtained when the iron powders are impregnated.

In practicing this invention, it is preferred to employ iron powders of predetermined size since the relation between the particle size, heating rate and the dimensional change of the supporting member is relatively critical.

Figure 8:
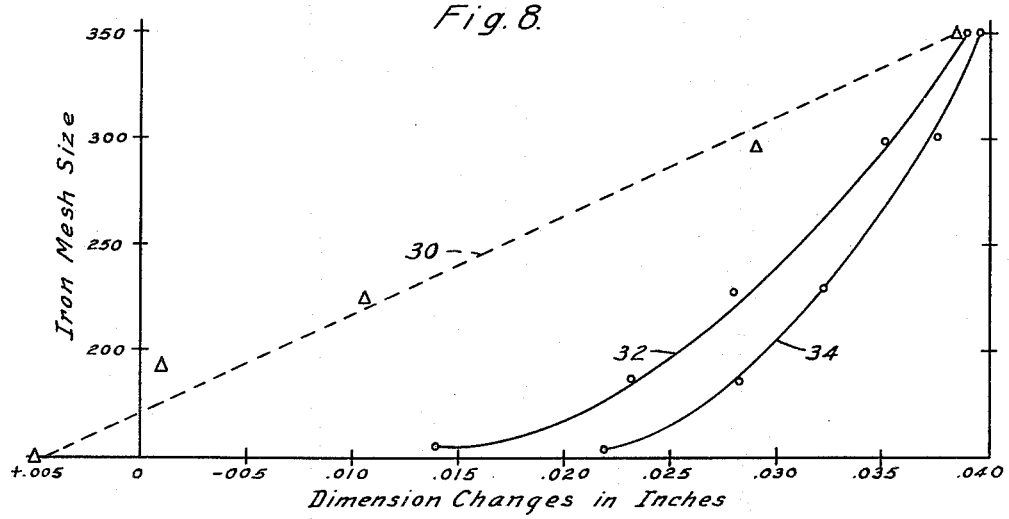
Fig. 8 is a graph, the curves of which illustrate the dimensional changes under heat of the supporting member for the mold.

Referring to the curves of Fig. 8, curve 30 illustrates the effect of the particle size on the dimensional change of impregnated supporting members in which the iron particles range in size of a fineness up to 350 mesh, with the ratio by weight between the impregnating metal and the iron particles being 1, when subjected to a heating rate of 111° C. per minute. Curves 32 and 34 illustrate the effect of the particle size on the dimensional changes where the supporting member is formed by sintering the iron particles prior to impregnating them with copper or the like when heated at a rate of 20° C. per minute, curve 32 representing the dimensional change across the bottom of the reinforced mold, and curve 34 representing the dimensional change across the top of the reinforced mold. These curves indicate that a minimum of distortion occurs in the supporting member where iron particles having a size of the order of 150 mesh are employed together with fast heating rates. The curves also indicate that the larger the particle size the less will be the degree of sintering, and consequently the shrinkage or dimensional change of the supported mold will be less than with the finer particles.

Figure 9:
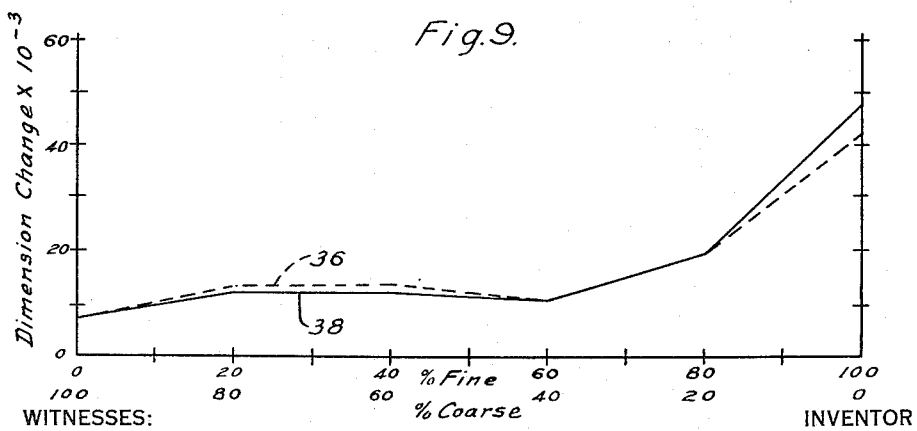
Fig. 9 is a graph, the curves of which illustrate the dimensional changes under heat encountered when the composition of certain of the elements of the supporting member is varied.

However, referring to the curves of Fig. 9, it is seen that a modification of the teachings of the implications of the curves of Fig. 8 is needed in order to produce a supporting member for the electroformed mold to give a supported mold which will have the most strength with a minimum of dimensional changes when subjected to heat. In Fig. 9, curve 36 is representative of the dimensional changes across the top of the mold reinforced in the manner described, in which the size of iron particles is varied, as will be described, and curve 38 is representative of the dimensional change across the bottom of the same mold at a heating rate of 24.4° C. per minute.

In making the reinforced mold upon which curves 36 and 38 are based, the iron particle size was varied from what is termed 100% coarse iron particles to 100% fine iron particles. The mesh size of the coarse iron particles employed is within —10+100, as measured on the Tyler standard mesh screen, while the mesh size of the fine iron particles is —140+375, as measured by the Tyler standard mesh screen. The coarse iron particles are of the type known as the National Radiator iron, a typical particle size analysis of which is 23% of —10+16, 34% of —16+20, 29% of —2+40, 9% of —40+60, 3% of —60+80, and 2% of —80+100, while the fine iron particles are of Swedish iron having a particle size analysis of 12% of —140+170, 16% of —170+200, 14% of —200+270, 12% of —270+325, and 46% of —325+375. These curves indicate that as the fineness of the iron particles increases, the dimensional changes when subjected to heat increase.

From the curves 36 and 38 of Fig. 9, it would appear that the least amount of change in dimension of the reinforced mold when subjected to heat is where 100% of the coarse iron particles is employed in making the supporting member. However, in practicing this invention, it is found that with 100% coarse iron particles, a greater amount of impregnating metal having the characteristics of copper is required to completely fill the voids between the iron particles. The use of large amounts of copper or other suitable copper base alloys is not desirable, because with an increase in the copper content the mechanical properties of the supporting member are seriously impaired. Thus a preferred ratio between the iron powders and the impregnating metal is 1:1 by weight although this may be varied within the ratio limits of .8:1 and 1.2:1 with the resulting reinforced mold having a predetermined strength. Using this ratio of the weight of iron particles to the copper it is preferred to make up the weight of iron by mixing from 35% to 60% of the coarse iron particles having a mesh size of —10+100 with from 65% to 40% of the fine iron particles having a mesh size of —140+375.

The mold shown in Fig. 6 formed in the manner described hereinbefore may be carburized to harden the working face of the mold. For example, in a mold of the type illustrated in Fig. 6, and from which the plate 14 of chromium has been removed as by machining, it is found to have a hardness of 105 V. P. N. as measured across the face of the cavity, and a hardness of 198 V. P. N. as measured on the facing edge of the mold. When carburized at a temperature of about 815° C. in a carburizing atmosphere and then quenched in a salt-water quenching medium, it is found that the electroformed mold is carburized and that the carburized mold is fully hardened. For example, it is found that the hardness of the face across the mold cavity is increased to about 680 V. P. N., while the hardness of the facing edge is increased to 927 V. P. N. At the same time, it is found that the hardness of the supporting member formed by the iron powders impregnated with copper is about 178 V. P. N.

An examination of the articles produced in accordance with this invention reveals that the bond between the supporting member and the electroformed mold is a continuous bond throughout the surfaces of the mold surrounded and in contact with the supporting member. Such a bond cooperates with the materials forming the mold and the supporting member to give high thermal conductivity through the mold and the supporting member, as well as giving a high strength reinforced mold. Since the composition of the reinforced mold has a relatively high thermal conductivity, it is apparent that such molds can be employed where it is desired to effect the transfer of heat either to or from the mold cavity.

Although not shown, the heating coils, reinforcement inserts or the like may be included in the supporting member of the mold without difficulty. The inclusion of heating coils in the reinforced mold of this invention is particularly beneficial where the molds are to be employed as plastic dies or the like, where it is desired that the heating tubes be as close to the working surface of the mold as is possible. Where heating tubes are inserted in the iron powders prior to impregnating the iron of the supporting member, it is desirable, however, that the composition of the heating tubes be of a metal whose solubility is such that good wetting of the material will be obtained by the copper, but will not be so soluble that it will dissolve to any great extent in the impregnating metal. Iron base tubing is, therefore, preferred as the heating tubes where heating tubes are to be included within the supporting member for the mold. Such iron base tubings, however, should be annealed after forming to prevent intergranular penetration of the impregnating metal or alloy during the impregnating treatment of the iron powders.

In an embodiment of this invention where it is desired to provide a mold of chromium or nickel, the mold may be formed by any of the well-known chromium or nickel plating processes, after which the chromium or nickel, or combination thereof, plate is further subjected to an iron plating process to form a thin film of iron on the chromium or nickel plate, whichever is employed. The chromium or nickel mold having the iron plating electroformed thereon is thereafter subjected to the process described hereinbefore of applying the supporting member to the mold. It is necessary to provide the chromium or nickel plates with the electroformed iron over the backing surface of the mold, because, where nickel is employed, the nickel dissolves into the copper employed as the impregnating medium for the supporting member, whereas with the chromium plate a satisfactory bond cannot be secured between chromium and the composite backing or reinforcing member. It is thought that the chromic oxide film present on the chromium plate prevents wetting except in localized spots.

The electroformed iron is preferred in all cases for forming the surface to which the composite backing member is secured, because of the limited solubility relation which exists between the impregnating metal and iron at 1100° C. At this temperature, copper, or copper base alloys, wets the iron very readily, yet at the same time the solubility restriction limits the amount of iron which can be dissolved in the copper. The solubility relation prevents the electroformed iron of the mold from dissolving into the impregnating metal of the supporting member to form a homogeneous alloy.

By practicing this invention, it is not necessary to employ the relatively thick electroformed molds utilized heretofore, it being found that a reinforced mold can be satisfactorily formed having the desired characteristics of strength and hardness together with clear-cut details in the molding portion where electroformed plates having a thickness of between $\frac{1}{16}$ inch and $\frac{1}{4}$ inch are employed. However, reinforced molds constructed in accordance with this invention can also be made successfully where heavier plates of the electroformed iron are employed, but the time required for preparing heavy molds is a disadvantage.

In reinforcing the molds as described hereinbefore where the exceedingly thin electroformed plates are utilized, substantially no distortion of the mold is obtained. Where the mold is supported by filling the cavity with a refractory material in the manner described hereinbefore, no distortion is obtained in bonding the supporting member to the mold. Further, by practicing this invention, the character of the outside surface of the electroformed mold is unimportant, as the supporting member is found to be effectively bonded to such surface with a continuous bond regardless of the irregular condition of the electroformed surface.

Figure 7:
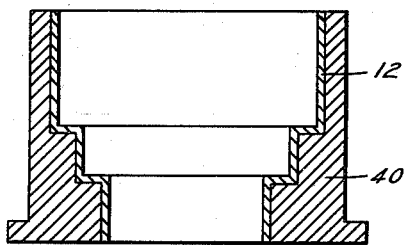
Fig. 7 is a view in section of another reinforced mold embodying the teachings of this invention.

In Fig. 7 there is illustrated a mold formed in accordance with this invention which is suitable for the making of bushings from plastic material. In this embodiment, the mold 12 formed of the iron electroformed plate is reinforced and supported by the supporting member 40 formed of iron powders impregnated with metal having the characteristics of copper, the supporting member 40 being thereafter machined for fitting the mold into a suitable die retainer (not shown). In making articles such as that shown in Fig. 7, it is preferred to employ a shell or outer ring of graphite or some similar material instead of the steel ring 24 illustrated in Fig. 5 for retaining the iron powders. After the supporting member 40 is formed by impregnating the iron powders and bonded to the electroformed mold 12, the graphite ring, as well as a portion of the supporting member 40, is readily machined from the composite article to any preformed dimensions. The reinforced mold of Fig. 7 can be carburized and hardened in the same manner described with reference to reinforced mold of Fig. 6.

This invention is applicable to the making of dies, molds, forces, punches, embossing plates and the like, and wherever the term "mold" is employed in the claims, it is to be interpreted broadly to include all of these and similar applications. While the description given hereinbefore is directed to the reinforcement of a mold for use particularly in the making of a gear formed from fibrous material impregnated with a synthetic resin, and to the making of a mold for making bushings of plastics, it is not to be limited thereto, since reinforced molds or dies produced by this invention can be applied to many stamping and forming operations.

I claim as my invention:

1. In the process of reinforcing a mold member, the steps of, plating a thin film of chromium on the facing edge of the mold, allowing the film of chromium to become oxidized, applying to the back of the mold a metal in a finely divided state, and impregnating the finely divided metal with a metal having a lower melting point and being capable of wetting the finely divided metal and the mold thereby to bond the finely divided metal into a strong supporting member which is bonded to the mold, the thin film of oxidized chromium on the facing edge of the mold preventing the metal having the lower melting point from flowing to and wetting the working face of the supported mold.

2. In the process of reinforcing a mold member, the steps of, applying a thin film of chromium to the facing edge of the mold adjacent the working face of the mold, oxidizing the film of chromium, applying to the back of the mold a metal in a finely divided state, and impregnating the finely divided metal with a metal having a lower melting point and which is capable of wetting the finely divided metal and the mold thereby to bond the finely divided metal into a strong supporting member which is bonded to the mold, the oxidized chromium film on the facing edge of the mold preventing the metal having the lower melting point from flowing and wetting the working face of the supported mold.

3. In the process of reinforcing a mold member, the steps of, applying a thin film of chromium to the facing edge of the mold, subjecting the mold with the chromium film thereon to a treatment consisting of heating the mold to a temperature between 825° C. and 865° C. in a wet hydrogen atmosphere and cooling the mold to oxidize the film of chromium and anneal the mold, applying to the back of the mold a metal in a finely divided state, and impregnating the finely divided metal with a metal having a lower melting point and which is capable of wetting the finely divided metal and the mold thereby to bond the finely divided metal into a strong supporting member which is bonded to the mold, the oxidized chromium film on the facing edge of the mold preventing the metal having the lower melting point from flowing and wetting the working face of the mold.

4. In the process of reinforcing a mold member provided with a cavity forming the working face thereof, the steps of, applying to the facing edge of the mold a thin film of chromium, allowing the film of chromium to become oxidized, filling the cavity of the mold with a refractory material, sealing the filled cavity with a refractory cement, applying to the back of the mold a metal in a finely divided state, and impregnating the finely divided metal with a metal having a lower melting point and being capable of wetting the finely divided metal and the mold thereby to bond the finely divided metal into a strong supporting member which is bonded to the mold, the thin film of oxidized chromium on the facing edge of the mold and the refractory material applied to the cavity cooperating to prevent the metal having the lower melting point from flowing to and wetting the working face of the cavity of the mold.

5. In the process of reinforcing a mold member, the steps of, applying a thin film of chromium to the facing edge of the mold adjacent the working face of the mold, oxidizing the film of chromium, applying to the back of the mold a metal in a finely divided state, sintering the finely divided metal as applied to the mold, and impregnating the sintered finely divided metal with a metal having a lower melting point and which is capable of wetting the sintered metal and the mold thereby to bond the sintered metal into a strong supporting member which is bonded to the mold, the oxidized chromium film on the facing edge of the mold preventing the metal having the lower melting point from flowing and wetting the working face of the supported mold.

6. In a reinforced mold member, in combination, a mold comprising a thin ferrous electroformed plate having a working mold face of a predetermined dimensional configuration, and a reinforcing member disposed to support the mold in operative position with its working mold face free from distortion, the reinforcing member comprising ferrous particles impregnated with a metal having a lower melting point than ferrous metal and being capable of wetting ferrous metal, the particles consisting of 35% to 60% of coarse particles having a mesh size of $-10+100$ and 65% to 40% of fine particles having a mesh size of $-140+375$, the metal having the lower melting point bonding the ferrous particles into a strong supporting member and bonding the supporting member to the mold.

7. In a reinforced mold member, in combination, a mold comprising a ferrous electroformed plate having a working mold face of a predetermined dimensional configuration, the electroformed plate having a thickness between $\frac{1}{16}$ and $\frac{1}{4}$ of an inch, and a reinforcing member disposed to support the mold in operative position with its working mold face free from distortion, the reinforcing member comprising a ferrous metal in a finely divided state impregnated with another metal having a lower melting point than ferrous metal and being capable of wetting ferrous metal, the metal having the lower melting point bonding the finely divided ferrous metal into a strong supporting member and bonding the supporting member to the mold.

8. In a reinforced mold member, in combination, a mold comprising a thin ferrous electroformed plate having a working mold face of a predetermined dimensional configuration, and a reinforcing member disposed to support the mold in operative position with its working mold face free from distortion, the reinforcing member comprising finely divided iron particles impregnated with a metal having a lower melting point than ferrous metal and being capable of wetting ferrous metal, the lower melting point metal bonding the iron particles into a strong supporting member and bonding the supporting member to the ferrous mold.

9. In a reinforced mold member, in combination, a mold comprising a thin ferrous electroformed plate having a working mold face of a predetermined dimensional configuration, and a reinforcing member disposed to support the mold in operative position with its working mold face free from distortion, the reinforcing member comprising finely divided iron particles impregnated with a metal having a lower melting point than ferrous metal and being capable of wetting ferrous metal, the lower melting point metal bonding the iron particles into a strong supporting member and bonding the supporting member to the ferrous mold, the bond between the supporting member and the mold being a continuous structure throughout the supported surface of the mold to give a high thermal conductivity to the reinforced mold member.

10. In a reinforced mold member, in combination, a mold comprising a thin ferrous electroformed plate having a working mold face of a predetermined dimensional configuration, the electroformed plate having a thickness between $\frac{1}{16}$ and $\frac{1}{4}$ of an inch, and a reinforcing member disposed to support the mold in operative position with its working mold face free from distortion, the reinforcing member comprising ferrous particles impregnated with a metal having a lower melting point than ferrous metal and being capable of wetting ferrous metal, the ferrous particles consisting of 35% to 60% of coarse particles having a mesh size of —10+100 and 65% to 40% of fine particles having a mesh size of —140+375, the lower melting point metal bonding the ferrous particles into a strong supporting member and bonding the supporting member to the ferrous mold.

11. In a reinforced mold member, in combination, a mold comprising a thin ferrous electroformed plate having a working mold face of a predetermined dimensional configuration, the electroformed plate having a thickness between $\frac{1}{16}$ and $\frac{1}{4}$ of an inch, and a reinforcing member disposed to support the mold in operative position with its working mold face free from distortion, the reinforcing member comprising ferrous particles impregnated with a metal having a lower melting point than ferrous metal and being capable of wetting ferrous metal, the ferrous particles consisting of 35% to 60% of coarse particles having a mesh size of —10+100 and 65% to 40% of fine particles having a mesh size of —140+375, the lower melting point metal bonding the ferrous particles into a strong supporting member and bonding the supporting member to the ferrous mold, the bond between the supporting member and the mold being a continuous structure throughout the supported surface of the mold to give a high thermal conductivity to the reinforced mold member.

12. In the process of producing a mold member, the steps of, applying a thin film of chromium to the facing edge of the mold adjacent the working face of the mold, oxidizing the film of chromium, applying to the back of the mold a metal in a finely divided state, impregnating the finely divided metal with a metal having a lower melting point and which is capable of wetting the finely divided metal and the mold thereby to bond the finely divided metal into a strong supporting member which is bonded to the mold, the oxidized chromium film on the facing edge of the mold preventing the metal having the lower melting point from flowing and wetting the working face of the supported mold, removing the film of oxidized chromium from the facing edge of the mold, and subjecting the bonded mold and supporting member to carburizing treatment to increase the hardness of the working face of the mold.

JAMES M. KELLY.